UNITED STATES PATENT OFFICE.

PHILIP FREDRICK LENHART, OF BROOKLYN, NEW YORK, ASSIGNOR TO HUGO O. LOEWI, OF NEW YORK, N. Y.

CORK COMPOSITION AND METHOD OF MAKING THE SAME.

1,008,972.      Specification of Letters Patent.      Patented Nov. 14, 1911.

No Drawing.      Application filed February 5, 1910. Serial No. 542,364.

*To all whom it may concern:*

Be it known that I, PHILIP FREDRICK LENHART, citizen of the United States, residing at 22 Rockaway avenue, Brooklyn, New York, have invented a new and useful Cork Composition and Method of Making the Same; and I do hereby declare the following to be a full, clear, and exact description of the same.

My invention relates to a new and improved cork composition.

It relates particularly to a new article of manufacture to be used as a substitute for natural cork, and capable of replacing the same for nearly all purposes.

The object of the invention is to provide a means for utilizing cork waste, and furnishing therefrom a cheap and complete substitute for the now very expensive raw material.

It is especially adaptable for use in bottle stoppers and caps, for flooring, for heat isolation, sound deadening, and almost any other purpose for which the natural cork is now used.

To carry out my invention I proceed as follows:—To make a quantity of the composition in which the cork constituent shall amount to ten pounds, I dissolve separately in water 2 ounces of gum arabic, 1½ ounces of starch, 1 ounce of gelatin, one ounce of white sugar and two ounces of glue. Enough water is added to make a quite fluid solution of each substance. When they are all dissolved, I mix these solutions together, add water if necessary to obtain proper fluidity, then place them in a steam jacketed kettle, and when they have reached the boiling point, I add 1 ounce of glycerin. Naturally some of the water will evaporate on boiling, and when the mixture is to serve as a binder for the cork, has reached the consistency of a thin paste it is ready for use. In a separate kettle I place 10 pounds of sliced or ground cork, and to this I add the above described binder. This may be sprayed onto the cork, or stirred up with it, or added in any other conventional way. When the mixture of cork and binder assumes a sufficient stiffness to be conveniently molded, it is poured into molds of the shape in which it is to be used, and subjected to pressure. After it is pressed it is placed in a kiln and dried, and while drying, should be kept clamped in forms to hold it together and prevent warping.

The reasons for using the various substances and the result of their use, are the following: Experiments extending over a number of years have shown that when glue and gelatin are combined with the cork (without any other ingredients) there results a firm and pliable cork composition, provided the composition be not dried too much. But on long exposure to the air the composition is liable to become brittle due to the complete drying up of the cementing agents. It is to overcome this tendency to brittleness that there are added the other ingredients, such as starch, gum arabic, sugar and glycerin. The object in using glycerin is to keep the cork composition pliable and elastic, but, if used alone, the glycerin would absorb moisture and would leach out of the composition. To prevent this and give a body to the glycerin, I use gum arabic, starch and sugar, which serve as a carrier for the glycerin and prevent its leaching out. Starch alone in solution mixed with glycerin does not give a good body, but when the gum arabic and sugar are added and the cork composition is subjected to heat and pressure there is produced such a body as is suitable to give to the cork the adherence and the elasticity that are required in a body that is to supplant natural cork. It is also to be remembered that the materials that I use combine with the tannic acid constituents that are present in the cork and form therewith an insoluble compound that is not decomposed by water or ordinary liquids.

Corks made with my composition have been put into beer bottles and these corks exposed for over a year, and in bottles containing a ten per cent. solution of ammonia, and have not decomposed and have remained and are still gas tight.

I cannot, of course, be absolutely certain that the reasons set forth are scientifically accurate, and that no other reactions take place. It is difficult, if not impossible, to state just what takes place when the various components of my cork composition are subjected to the action of heat in the presence of each other, but I believe that the sequence is as I have set forth, and any one by following the directions above set forth will produce an article answering all requirements of a substitute for natural cork.

This cork composition can be rendered fireproof, by treating it with a mixture of oxid of magnesia and chlorid of magnesia applied to its exterior and allowed to dry. To carry out this part of the process take a solution of chlorid of magnesia in water of a strength of 26° Baumé, and add thereto sufficient oxid of magnesia to make a moderately stiff paste, which apply in any suitable manner to the exterior of the cork composition. The fireproofing material will penetrate sufficiently into the composition to render it fireproof.

Naturally the constituents of my binder may vary in amount to a considerable extent without departing from the spirit of my invention.

Having thus fully described my invention what I claim is:

1. A cork substitute composed principally of ground cork waste, the particles of which have been cemented together by a small quantity of hot solution of gum arabic, starch, gelatin, sugar, glue and glycerin.

2. A cork composition consisting of the following materials in substantially the following proportions;—finely divided cork 10 lbs., gum arabic 2 ozs., starch 1½ ozs., gelatin 1 oz., sugar 1 oz., glue 2 ozs., and glycerin 1 oz.

3. The process of making cork composition, which consists in separately forming watery solutions of gum arabic, starch, gelatin, sugar and glue; mixing them together; raising the mixture to the boiling temperature; adding glycerin to the heated mixture; then adding thereto finely-divided cork in such a quantity that the mixture may serve simply to hold the cork particles together and drying the resulting product.

4. The method of making a cork composition, which consists in the following steps;— forming separate watery solutions containing 2 ozs. of gum arabic, 1½ ozs. starch, 1 oz. gelatin, 1 oz. white sugar and 2 ozs. glue; mixing the separate solutions together and raising the resulting material to the boiling temperature; adding to the boiling mixture 1 oz. of glycerin, and then combining the product with 10 lbs. of cork waste under pressure, substantially as set forth.

In testimony whereof, I have signed my name to this specification in the presence of two subscribing witnesses.

PHILIP FREDRICK LENHART.

Witnesses:
   HUGO O. LOEWI,
   ALBERT STETSNO.